United States Patent [19]

Kinoshita

[11] Patent Number: 5,721,998
[45] Date of Patent: Feb. 24, 1998

[54] FIXING MEMBER AND LENS BARREL HAVING THE FIXING MEMBER

[75] Inventor: Shin-ichi Kinoshita, Ohtawara, Japan

[73] Assignee: Nikon Corporation, Tokyo, Japan

[21] Appl. No.: 629,398

[22] Filed: Apr. 8, 1996

[30] Foreign Application Priority Data

Jun. 14, 1995 [JP] Japan ..................... 7-146640

[51] Int. Cl.$^6$ .................... G03B 17/00; F16F 1/36
[52] U.S. Cl. ........................... 396/529; 267/148
[58] Field of Search ........................ 396/529, 530, 396/531; 267/148, 159, 160

[56] References Cited

U.S. PATENT DOCUMENTS

| | | | |
|---|---|---|---|
| 5,185,622 | 2/1993 | Yoshibe et al. | 354/286 |
| 5,502,599 | 3/1996 | Kanno et al. | 359/827 |

Primary Examiner—Safet Metjahic
Assistant Examiner—Eric Nelson

[57] ABSTRACT

A fixing member includes a body member having a contact portion with a fixed member outwardly and a spring member disposed in an inward portion of the body member and protruding from the contact portion. The spring member is composed of a plastic material and formed integrally with the body member. The spring member has a bending portion disposed in the inward portion of the body member, a protruded portion, contacting the inward portion of the body member, for generating a first biasing force and a bent portion for reversing an extending direction in the interior of the body. The fixing member and the spring member are aggregated, formed into one united body and PMed (plastic-molded), thus providing the fixing member at a low cost.

21 Claims, 2 Drawing Sheets

FIXING MEMBER AND LENS BARREL HAVING THE FIXING MEMBER

BACKGROUND OF THE INVENTION

1. Field of the Invention

The present invention relates to a fixing member for fixing a rotatable member and to a lens barrel of a camera that makes use of this fixing member.

2. Related Background Art

A conventional fixing member obtains a force for fixation from a biasing force of a metallic spring member attached to a fixing member body.

Then, such a fixing member is used for fixing, e.g., a stop ring in a lens barrel.

The following is an explanation of a structure in which a stop ring mechanism of the lens barrel is equipped with a conventional fixing member with reference to FIG. 3.

Referring to FIG. 3, a stop ring 12, a fixing member 13 and a spring member 14 are incorporated into a fixed lens barrel 11. The metallic spring member 14 for the stop ring 12 and the fixing member 13 has a function to temporarily fix the stop ring 12 in a minimum stop position and prevent the stop ring 12 from carelessly moving when performing exposure control photographing in a shutter priority mode and a program mode. Further, the spring member 14 also has a function to, when effecting the exposure control photographing in a stop priority mode and a manual mode, release the fixing member 13 from the minimum stop position and make the stop ring 12 arbitrarily rotatable with an intention of a photographer.

Next, the operation thereof will be briefly explained.

After the stop ring 12 has been rotated to the minimum stop position, the fixing member 13 is slid by a finger in a thrust (optical-axis) direction and thus inserted into an insertion portion formed in an internal peripheral portion of the stop ring 12, thereby locking the rotating operation of the stop ring 12. When released, it is unlocked by sliding the fixing member 13 in the opposite direction.

According to the above-described prior art, the fixing member and the spring member are worked as separate members and then assembled. In the great majority of cases, the fixing member is composed of a resinous material, while the spring member is metallic, and therefore each requires an absolutely different manufacturing process. In addition to that, there must be added such a labor that the parts prepared have to be assembled.

Then, there arises a problem of needing a working expenditure of the parts and an extra cost due to a worsened workability of the assembly.

SUMMARY OF THE INVENTION

It is a primary object of the present invention to provide a fixing member offered at a lower cost by aggregating a fixing member and a spring member into one united body and PMing (plastic-molding) it and to provide, in addition, a lens barrel of a camera wherein a reduction in costs can be attained by using this fixing member.

To accomplish the above object, according to a first aspect of the present invention, a fixing member includes a body member having a contact portion with a fixed member outwardly and a spring member disposed in an inward portion of the body member and protruding from the contact portion. The spring member is composed of a plastic material and formed integrally with the body member. The spring member has a bending portion disposed in the inward portion of the body member, a protruded portion, contacting the inward portion of the body member, for generating a first biasing force and a bent portion for reversing an extending direction in the interior of the body.

According to a second aspect of the present invention, the bent portion has at least three pieces of protruded portions formed on the surface which becomes an internal surface when bent in the longitudinal direction of the spring member and contacting each other when bent. The three protruded portions contact each other, thereby generating a second biasing force.

Furthermore, according to a third aspect of the present invention, a lens barrel comprises a rotary ring rotatably fitted to an outer peripheral portion of a fixed drum and a fixing member, interposed between the fixed drum and the rotary ring, for hindering a rotation of the rotary ring by a biasing force of the spring member. The fixing member includes a body member having a contact portion contacting the outer peripheral portion of the fixed drum outwardly and a contact portion contacting an inner peripheral surface of the rotary ring. The fixing member also includes a spring member disposed in an inward portion of the body member and protruding from the contact portion. The spring member is composed of a plastic material and formed integrally with the body member. The spring member includes a bending portion disposed in the inward portion of the body member, a protruded portion, contacting the body member inward portion formed in the vicinity of the bending portion, for generating a first biasing force, and a bent portion for reversing an extending direction in the interior of the body member.

Moreover, according to a fourth aspect of the present invention, the bent portion has at least three pieces of protruded portions formed on the surface which becomes an internal surface when bent in the longitudinal direction of the spring member and contacting each other when bent. The three protruded portions contact each other, thereby generating the second biasing force.

According to the present invention, the spring member in the fixing member is formed of a plastic material integrally with the body member. Then, the spring member is provided with the bending portion disposed in the inward portion of the body member, the protruded portion, contacting the body member inward portion formed in the vicinity of the bending portion, for generating the first biasing force and the bent portion for reversing the extending direction inwardly of the body. The assured fixation can be thereby attained at low costs.

Further, the bent portion has at least three pieces of protruded portions formed on the surface which becomes the internal surface when bent in the longitudinal direction of the spring member and contacting each other when bent. The three protruded portion contact each other, thereby determining a bending position and generating the second biasing force. With this construction, a stronger biasing force is obtained, and hence the fixation can be done more surely.

BRIEF DESCRIPTION OF THE DRAWINGS

Other objects and advantages of the present invention will become apparent during the following discussion in conjunction with the accompanying drawings, in which:

FIG. 2A illustrates the as-parts state thereof; FIG. 2B shows an intermediate state thereof; FIG. 2C shows a state before being incorporated into a lens barrel.

DESCRIPTION OF THE PREFERRED EMBODIMENTS

[Embodiments]

Preferred embodiments of the present invention will hereinafter be discussed with reference to the accompanying drawings.

Figure 1:
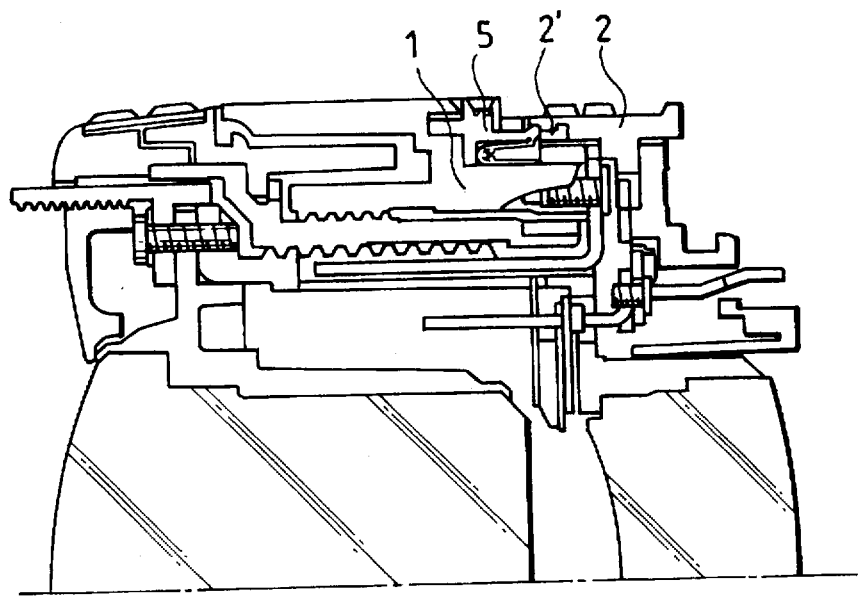
FIG. 1 is a vertical sectional view illustrating a lens barrel using a fixing member according to the present invention.
Figure 3:
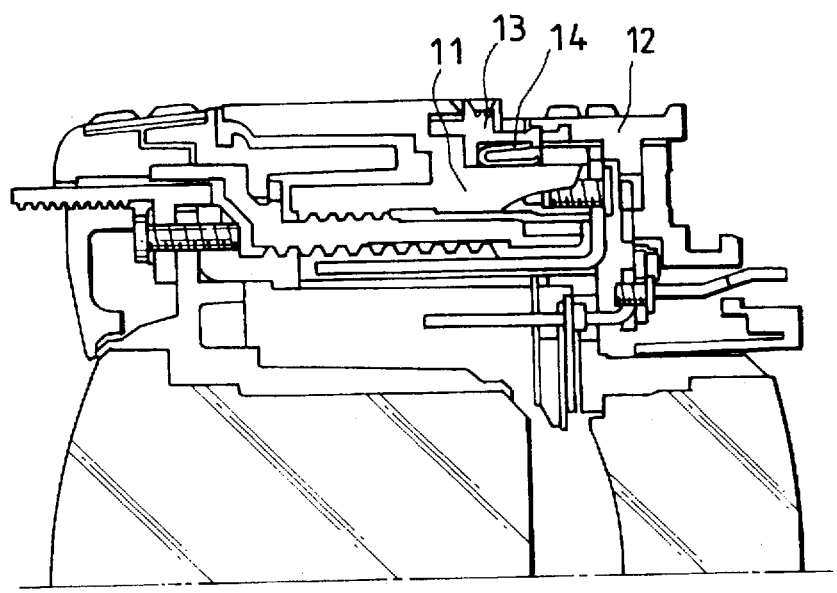
FIG. 3 is a vertical sectional view of a lens barrel using a conventional fixing member.

FIG. 1 is a vertical sectional view illustrating a lens barrel using a fixing member according to the present invention.

Referring first to FIG. 1, a stop ring 2 is rotatably fitted to an outer peripheral surface of a fixed drum 1. Further, a fixing member 5 is so provided on the outer peripheral surface of the fixed drum 1 adjacent to the stop ring 2 as to be slidable in an optical-axis direction. The stop ring 2 is formed with an insertion unit 2' into which the fixing member 5 is inserted. When fixing the stop ring 2, the fixing member 5 is inserted thereinto. When performing exposure control photographing in a shutter priority mode and a program mode, the stop ring 2 is rotated to a minimum stop position, and the fixing member 5 can be inserted into the insertion unit 2' by moving it in the optical-axis direction. In the thus inserted state, the fixing member 5 is biased toward the fixed drum 1 and temporarily fixed to the fixed drum 1 by a frictional force produced by such biasing. The stop ring 2 is thereby hindered from being carelessly moved. Further, when effecting the exposure control photographing in a stop priority mode and a manual mode, the stop ring 2 is constructed to get released from the minimum stop position by disengaging the fixing member 5 inserted into the insertion unit 2' and to be usable arbitrarily rotatably by an intention of a photographer.

Next, the fixing member of the present invention will be explained with reference to FIGS. 2A to 2C.

Figure 2A:
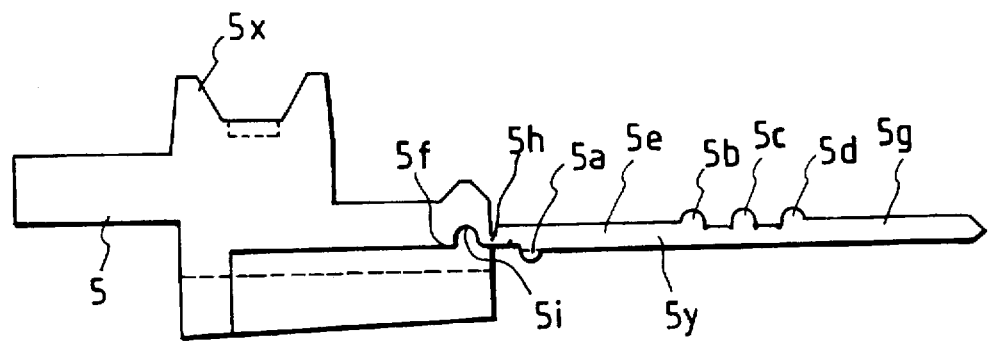
FIGS. 2A to 2C are explanatory views respectively showing a process from an as-parts state of a fixing member 5 of the present invention to a using state thereof.
Figure 2B:
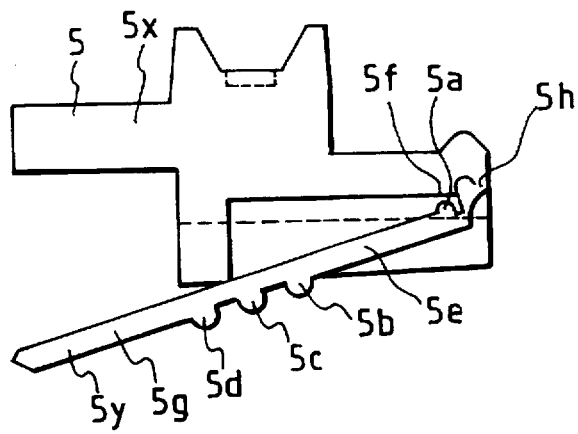
Figure 2C:
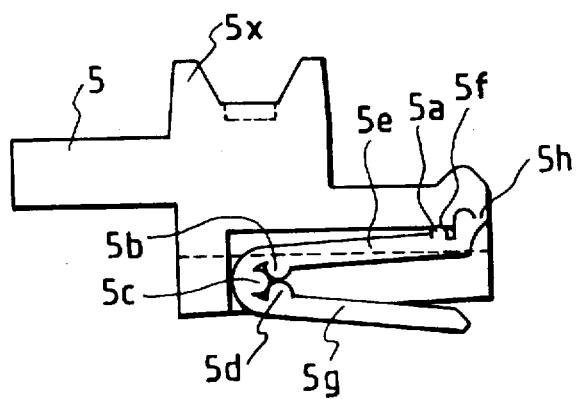

FIGS. 2A to 2C are explanatory views each showing a process of how the fixing member 5 changes from an as parts state to a using state. FIG. 2A illustrates the asparts state thereof. FIG. 2B shows an intermediate state. FIG. 2C illustrates a state before being incorporated into the lens barrel.

Referring again to FIGS. 2A to 2C, the fixing member 5 is constructed of a body member 5x and a spring member 5y. The fixing member 5 is PMed (plastic-molded) by use of PBT (polybutylenetelephthalate). In this molding, the body member 5x of the fixing member 5 and the plate-like spring member 5y extending from one edge thereof are worked integrally.

A protruded portion 5a is formed on the under surface of the spring member 5y, and protruded portions 5b, 5c, 5d are also formed on the upper surface. Then, these protruded portions 5a, 5b, 5c, 5d each serve as a fulcrum of the lever for generating a spring biasing force which will be mentioned later.

The following is a detailed explanation of a method of adjusting the spring force and assembling the fixing member 5 with reference to FIGS. 2A to 2C.

To start with, a spring proximal portion 5e of the spring member 5y is bent downward at approximately 180° in a position of a bending portion 5h. Then, with this bending, the protruded portion 5a formed on the under surface of the spring member 5y contacts an internal surface 5f of the fixing member 5. As a result, the protruded portion 5a functions as the lever fulcrum, thereby producing a first biasing force to the spring member 5y on the basis of the biasing force caused in the bending portion 5h. At this time, the bending portion 5h firmly holds the integrality of the body member 5x with the spring member 5y but does not disconnect them.

Note that a recessed portion 5i is formed in the vicinity of the bending portion 5h of the body member 5x, and, when bent, a part of the spring member 5y is fitted into the recessed portion 5i. The bending is thereby facilitated.

Next, when bending a spring tip portion 5g of the spring member 5y through approximately 170° in the opposite direction from the extending direction, the protruded portions 5b, 5c, 5d formed on the upper surface of the spring member 5y contact each other. As a result, the protruded portions 5b, 5c, 5d function as lever fulcrums, resulting in a generation of a second biasing force to the spring member 5y on the basis of the biasing force caused in the bending portion.

Note that the spring biasing force may be adjusted corresponding to a mold modification for forming the protruded portions 5a, 5b, 5d in a desired shape with a desired size.

A resultant force of the first and second biasing forces should not be incomparable with the biasing force of the metallic spring member. Accordingly, substantially the same spring property as the metallic spring member is given enough to exhibit the function of the holding member of the fixing member.

As discussed above, in accordance with this embodiment, the fixing member 5 is PMed (plastic-molded) by use of PBT (Polybutylenetelephthalate) but is not confined to this. That is, the molding material to be used is preferably PBT (Polybutylenetelephthalate). As a matter of course, however, other plastic materials may be employed on condition that those materials are capable of firmly holding the integrality of the body member 5x with the spring member 5y and securing the spring property in this embodiment.

As described above, according to the present invention, the spring member of the fixing member is molded of the plastic material integrally with the body member. The spring member is also formed with the bending portion to be disposed in the inward portion of the body member, the protruded portion fitted into the body member recessed portion formed in the vicinity of the bending portion and working to produce the first biasing force and the bent portion for reversing the extending direction in the body interior. This brings about such an effect that assured fixing can be attained at a lower cost.

Further, the bent portion includes at least three pieces of the protruded portions formed on the surface which becomes the internal surface when bent in the longitudinal direction of the spring member and contacting each other when bent. The three protruded portions contact each other, thereby determining the bending position and generating the second biasing force. With this construction, there is such an effect that a stronger biasing force is obtained, and therefore the fixing can be performed more surely.

Then, there are exhibited tremendous effects, wherein the costs are reduced, and an assembly workability and a production efficiency are enhanced.

It is apparent that, in this invention, a wide range of different working modes can be formed based on the invention without deviating from the spirit and scope of the invention. This invention is not restricted by its specific working modes except being limited by the appended claims.

What is claimed is:

1. A fixing member comprising:

a body member;

a contact member constructed to contact a fixed member; and a biasing member connecting said body member to said contact member, having a protrusion formed in the vicinity of said body member, wherein said biasing member is composed of a resin and formed integrally with said body member, said protrusion, when said biasing member is bent, thereby contacts said body member and acts as a fulcrum, and a biasing force of this bent portion is converted into a biasing force of said contact member on the principle of a lever.

2. The fixing member according to claim 1, wherein said biasing member is bent twice and has a plurality of other protrusions contacting each other when bent for the second time, said other protrusions act as other fulcrums, and a second biasing force of said bent portion is converted into an additional biasing force to said contact portion on the principle of a lever.

3. The fixing member according to claim 2, wherein two bending directions of said biasing member are opposite to each other.

4. The fixing member according to claim 2, wherein said other protrusions number three.

5. The fixing member according to claim 1, wherein said body member is formed with a recess to facilitate the bending of the biasing member.

6. A lens barrel comprising:

a fixed drum;

a rotary ring rotatably fitted to an outer peripheral portion of said fixed drum; and a fixing member movable between a release position to permit relative mutual rotations of said fixed drum and said rotary ring and a fixing position to inhibit the relative rotations, wherein said fixing member is constructed of:

a body member immovable in a circumferential direction with respect to said fixed drum but movable in an optical axis direction, and engaging with said rotary ring when said fixing member is in the fixing position but coming off said rotary ring when said fixing member is in the release position;

a contact portion constructed to contact said fixed drum; and a biasing member, to connect said body member to said contact portion, having a protrusion formed in the vicinity of said body member, wherein said biasing member is composed of a resin and formed integrally with said body member, said protrusion contacts said body member when said biasing member is bent and acts as a fulcrum, and a biasing force of said bent portion is converted into a biasing force of said contact portion on the principle of a lever, and wherein said fixing member, only when an external force exceeding a frictional force produced based on the biasing force works, moves between the release position and the fixing position.

7. The lens barrel according to claim 6, wherein said biasing member is bent twice and has a plurality of other protrusions contacting each other when bent for a second time, said other protrusions act as other fulcrums, and a second biasing force of said bent portion is converted into an additional biasing force to said contact portion on the principle of a lever.

8. The lens barrel according to claim 7, wherein two bending directions of said biasing member are opposite to each other.

9. The lens barrel according to claim 7, wherein said other protrusions number three.

10. The lens barrel according to claim 6, wherein said body member is formed with a recess to facilitate the bending of the biasing member.

11. A molded resinous fixing member comprising:

a protrusion serving as a fulcrum;

an action portion to generate a force of action with respect to a side of said fixing member opposite said protrusion; and an elastic portion to generate a biasing force, wherein when said fixing member is bent at a bent portion, said bent portion becomes said elastic portion, and the biasing force of said elastic portion is converted into the force of action of said action portion through the fulcrum on the principle of a lever.

12. A fixing member in contact with a fixed member, said fixing member comprising:

a body member;

a contact member to contact the fixed member; and a biasing member connecting said body member to said contact member, having a protrusion formed in the vicinity of said body member, wherein said biasing member is made of a flexible material, and formed integrally with said body member, wherein said protrusion, when said biasing member is bent, contacts said body member and acts as a fulcrum, and wherein a biasing force of the bent biasing member is converted into a biasing force of said contact member on a lever principle.

13. A fixing member as claimed in claim 12, wherein said fixing member is made of resin.

14. A fixing member as claimed in claim 13, wherein said resin is PBT (polybutylenetelephthalate).

15. A fixing member as claimed in claim 12, wherein said fixing member is plastic-molded.

16. A fixing member comprising:

a body member;

a contact member; and a biasing member connecting said body member to said contact member, said biasing member including a protrusion;

wherein said biasing member is bent twice and includes a plurality of other protrusions that contact each other when the biasing member is bent for the second time and wherein said protrusion contacts said body member.

17. A fixing member as claimed in claim 16, wherein said biasing member is made of a flexible material and formed integrally with said body member.

18. A fixing member as claimed in claim 16, wherein a biasing force of the bent biasing member is converted to a biasing force of the contact member on a lever principle.

19. A fixing member as claimed in claim 16, wherein said fixing member is formed of a resin.

20. A fixing member as claimed in claim 19, wherein said resin is polybutylenetelephthalate (PBT).

21. A fixing member as claimed in claim 16, wherein said fixing member is used in a lens barrel assembly.

* * * * *